G. W. KAFER.
INSERTIBLE JOINT.
APPLICATION FILED JULY 8, 1918.
1,288,613.
Patented Dec. 24, 1918.
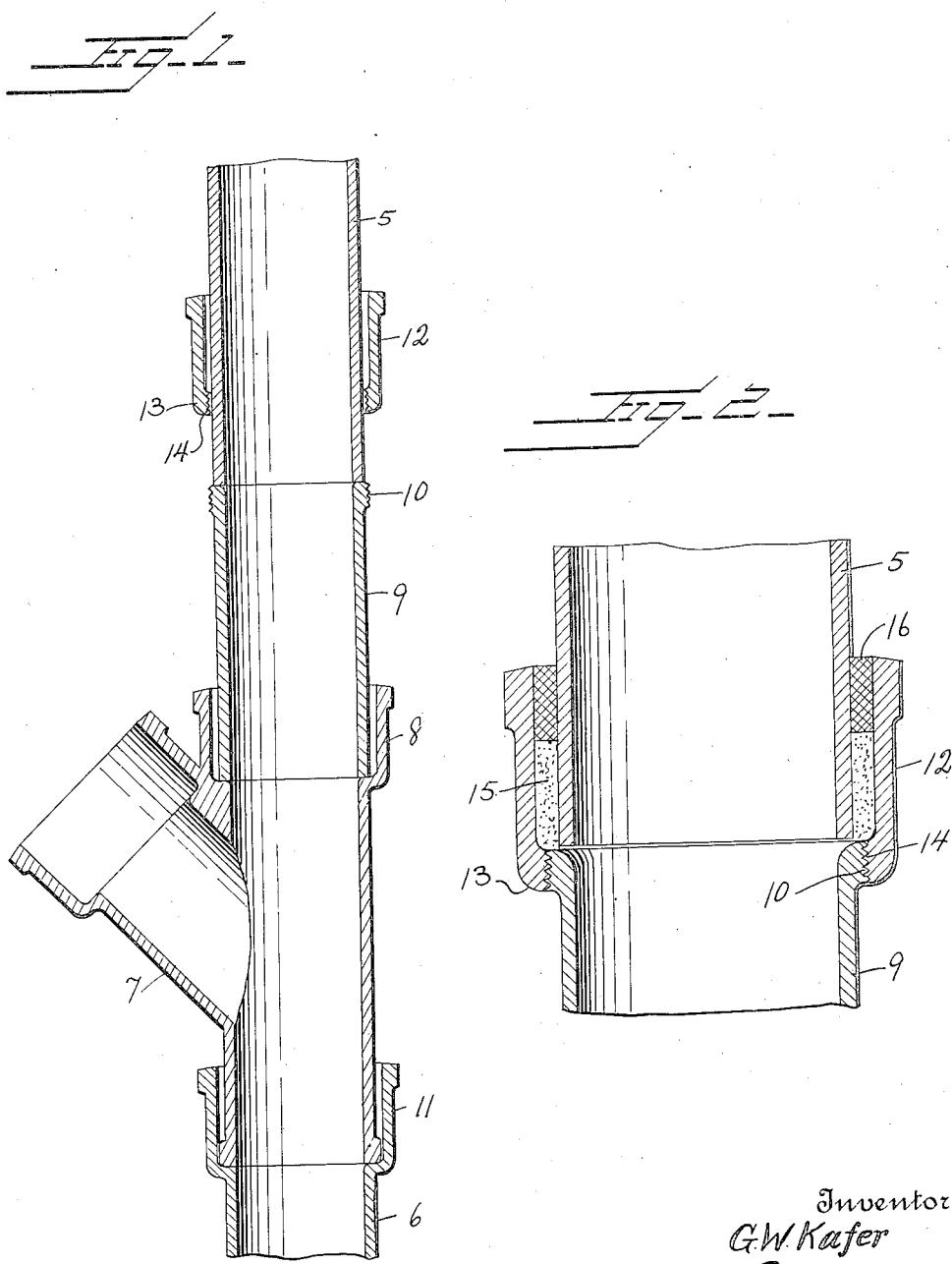

UNITED STATES PATENT OFFICE.

GEORGE W. KAFER, OF TRENTON, NEW JERSEY.

INSERTIBLE JOINT.

1,288,613.  Specification of Letters Patent.  Patented Dec. 24, 1918.

Application filed July 8, 1918. Serial No. 243,807.

*To all whom it may concern:*

Be it known that I, GEORGE W. KAFER, a citizen of the United States, residing at Trenton, in the county of Mercer and State of New Jersey, have invented certain new and useful Improvements in Insertible Joints, of which the following is a specification, reference being had to the accompanying drawings.

This invention relates to an improved insertible joint, and has for its primary object to provide a coupling device for soil pipes and the like whereby a T-connection may be easily and quickly made without necessitating the complete removal of the soil pipe.

It is another and more particular object of the invention to provide an insertible joint for the above purpose embodying a pipe section adapted to be engaged in one end of the T-connection and disposed in alinement with the main soil pipe, said pipe section being of the same diameter throughout its length as the soil pipe and exteriorly threaded at one end, and a coupling hub loosely engaged upon the soil pipe and adapted for connection to the threaded end of said pipe section.

It is also a further general object of my invention to provide a joint of the above character, whereby the T joint connection may be easily and quickly inserted and very securely connected to the soil pipe so that all possibility of leakage will be obviated.

With the above and other objects in view, the invention consists in the improved construction, combination and relative arrangement of the several parts as will be hereinafter more fully described, subsequently claimed and illustrated in the accompanying drawing in which similar reference characters designate corresponding parts throughout the several views, and wherein:—

Figure 1 is a vertical sectional view through a soil pipe with the T-connection inserted therein; and Fig. 2 is an enlarged sectional view showing the connection between the T and the soil pipe joined by means of the coupling hub and the parts calked.

Referring in detail to the drawing, 5 and 6 respectively indicate upper and lower sections of the soil pipe or the like. In the insertion of a T-connection, a section of the continuous soil pipe of the proper length is cut out, whereby the upper and lower pipe sections just referred to are produced.

7 designates a conventional form of T-connection, the main branch of which is disposed in longitudinal alinement with the soil pipe sections and is diametrically enlarged at one of its ends, as shown at 8, to receive one end of a pipe section 9 which bridges the open space between the T-connection and the lower end of the upper pipe section 5. The upper end of the pipe section 9 is thickened or enlarged and exteriorly threaded, as shown at 10, said threads projecting beyond the external periphery of the pipe section 5. The end of the soil pipe section 6 is also diametrically enlarged, as shown at 11, to receive the lower end of the main branch of the T-connection 7. In the spaces between the pipe sections 6 and 9 and the ends of the T-coupling 7, a suitable calking material is adapted to be inserted to tightly secure the parts together and thereby effectually prevent the leakage of water.

12 designates a coupling hub which, at one of its ends, is inwardly flanged, as at 13, said flange being provided with the screw threads 14 for engagement with the threads 10 on the end of the pipe section 9. This coupling hub is of appreciably greater diameter than the diameter of the soil pipe 5.

In the use of my improved joint, after removing or cutting out a section of the soil pipe, the hub 12 is then engaged upon the lower end of the upper pipe section. The T-connection 7 and the pipe section 9 are then assembled and inserted between the upper and lower sections 5 and 6 of the soil pipe. The hub 12 is then lowered upon the pipe section 5 and threaded upon the upper end of the pipe section 9, as clearly shown in Fig. 2. A suitable calking material 15 is arranged in the space between said hub and the wall of the pipe section 5 and a metal tamping ring or annulus 16 is then inserted within the upper end of the hub upon said calking material to tightly compact or compress the same. In this manner, the several parts of the T-coupling or connection may be easily and quickly assembled in a soil pipe without entirely dismantling the latter, while at the same time the possibility of leakage is effectually prevented.

From the foregoing description, taken in connection with the accompanying drawing, the construction, manner of use and several advantages of the invention will be clearly and fully understood. While I have herein illustrated a certain form of the T-member, it will be apparent that this member, as well as the other parts of the device are susceptible of considerable modification in the form, proportion and arrangement thereof. Accordingly, I reserve the privilege of adopting all such legitimate changes as may be fairly embodied within the spirit and scope of the invention as claimed.

I claim:—

In combination with the main pipe sections, a T-coupling insertible between said pipe sections with one branch disposed in alinement therewith, a pipe section extending between one end of the T-coupling and one of the main pipe sections and having the end thereof opposed to the end of said latter pipe section diametrically enlarged and externally threaded, a coupling hub loosely engaged upon said main pipe section and formed with an inwardly projecting threaded flange on one of its ends for connection to the threaded end of said insertible pipe section, said coupling hub being of appreciably greater diameter than the main pipe section, and means adapted to be arranged in the space between the main pipe section and said hub and engaged directly upon the threaded connection between the hub and the interposed pipe section to effect a water-tight joint therebetween.

In testimony whereof I hereunto affix my signature in the presence of two witnesses.

GEORGE W. KAFER.

Witnesses:
    FRANK E. DALRYMPLE,
    EDWARD M. SPEAR.